US008109698B2

(12) United States Patent
De Greef

(10) Patent No.: US 8,109,698 B2
(45) Date of Patent: Feb. 7, 2012

(54) APPARATUS AND METHOD FOR CHANNELLED TRANSPORT OF FRUITS USING A FLUID PATHWAY

(75) Inventor: Jacob Hendrik De Greef, Tricht (NL)

(73) Assignee: De Greef's Wagen-, Carrosserie-En Machinebouw B.V., JB Tricht (NL)

( * ) Notice: Subject to any disclaimer, the term of this patent is extended or adjusted under 35 U.S.C. 154(b) by 0 days.

(21) Appl. No.: 12/085,114

(22) PCT Filed: Nov. 17, 2006

(86) PCT No.: PCT/NL2006/000578
§ 371 (c)(1),
(2), (4) Date: Mar. 24, 2009

(87) PCT Pub. No.: WO2007/058528
PCT Pub. Date: May 24, 2007

(65) Prior Publication Data

US 2009/0285642 A1 Nov. 19, 2009

(30) Foreign Application Priority Data

Nov. 17, 2005 (NL) ..................................... 1030450

(51) Int. Cl.
*B65G 53/28* (2006.01)

(52) U.S. Cl. .............. 406/106; 406/12; 406/34; 406/75; 406/192

(58) Field of Classification Search .................. 406/106, 406/12, 34, 75, 192
See application file for complete search history.

(56) References Cited

U.S. PATENT DOCUMENTS

| | | | | |
|---|---|---|---|---|
| 2,824,665 | A | | 2/1958 | Lamouria |
| 3,195,713 | A | * | 7/1965 | Morris et al. ................ 198/759 |
| 3,499,687 | A | * | 3/1970 | Ellis ............................... 406/82 |
| 3,704,041 | A | | 11/1972 | Loveland |
| 3,918,116 | A | * | 11/1975 | Valdespino .................... 15/3.13 |
| 3,931,999 | A | * | 1/1976 | McCain .......................... 406/14 |
| 3,977,514 | A | * | 8/1976 | Kaess ........................... 198/853 |
| 4,059,046 | A | * | 11/1977 | Yamazaki et al. ............. 99/355 |
| 4,154,484 | A | * | 5/1979 | Holzenberger ............... 406/106 |
| 4,194,922 | A | * | 3/1980 | Gransell et al. ................... 134/1 |
| 4,320,995 | A | * | 3/1982 | Tennes et al. .................. 406/39 |
| 5,248,045 | A | * | 9/1993 | Alvelda ........................ 209/522 |
| 5,259,302 | A | * | 11/1993 | Chen .............................. 99/405 |

(Continued)

FOREIGN PATENT DOCUMENTS

FR 2 175 630 A 10/1973

(Continued)

OTHER PUBLICATIONS

International Search Report of the International Search Authority for Application No. PCT/NL2006/000578, dated Mar. 15, 2007.

*Primary Examiner* — Joseph A Dillon, Jr.
(74) *Attorney, Agent, or Firm* — The Webb Law Firm

(57) ABSTRACT

The present invention provides an apparatus and method for transporting fruits, comprising:
- a frame;
- a channel for fluid arranged on the frame for the purpose of transporting the fruits between an entry side and an exit side of the channel;
- a system for causing circulation of the fluid; and
- transport influencing means for influencing transport of the fruits and/or the fluid.

15 Claims, 5 Drawing Sheets

2A 2B 2C

Figure 1:
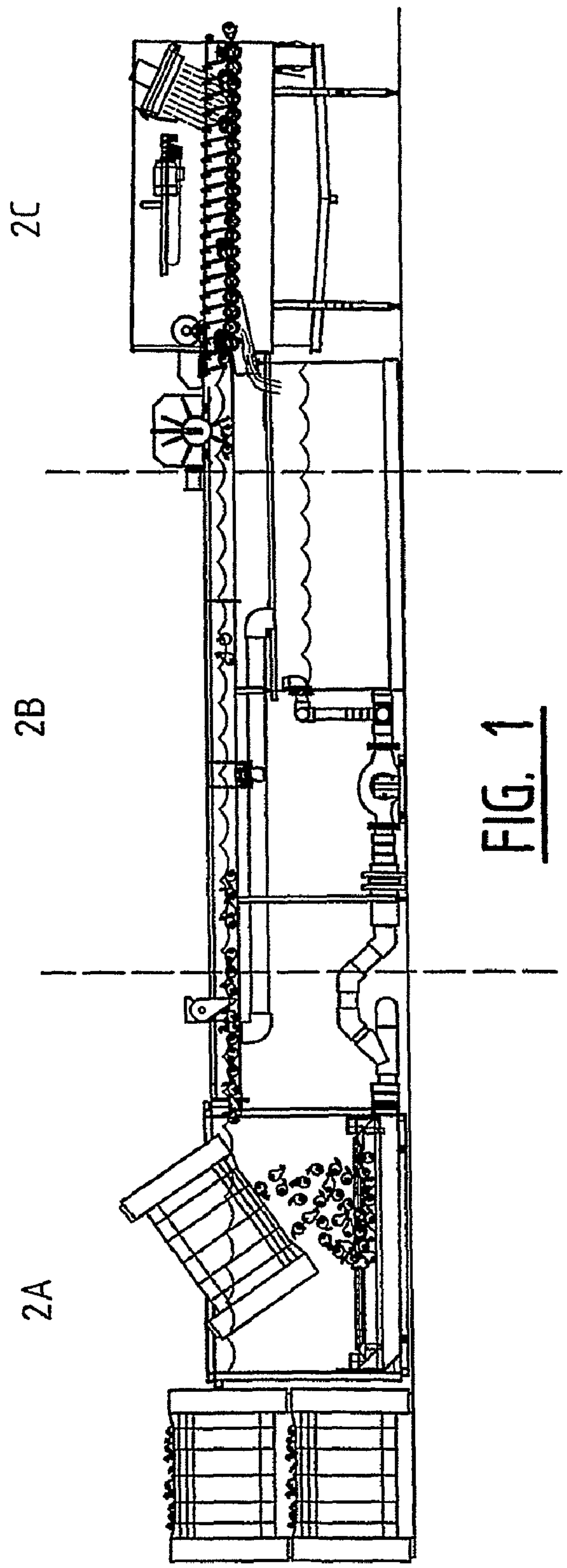

U.S. PATENT DOCUMENTS 5,704,733 A * 1/1998 de Greef ..................... 406/79
5,775,348 A * 7/1998 Rush et al. ..................... 134/72
5,868,256 A * 2/1999 Teppo ..................... 209/173
6,616,385 B1 9/2003 Raginskii
6,655,878 B1 * 12/2003 de Vos et al. ..................... 406/77
6,837,362 B2 * 1/2005 van Wijngaarden et al. . 198/443
6,840,715 B2 * 1/2005 Crovara Pescia ............... 406/92
6,971,786 B2 * 12/2005 Krambrock ................ 366/165.1
7,361,282 B2 * 4/2008 Smullin ..................... 210/703
7,674,077 B2 * 3/2010 Opatril ..................... 406/106
7,691,261 B2 * 4/2010 Deskins ..................... 210/97
7,695,220 B2 * 4/2010 Bryan et al. ..................... 406/84

FOREIGN PATENT DOCUMENTS

FR 2 664 566 A 1/1992

* cited by examiner 12
14
10
13
16
14
8
12
4

APPARATUS AND METHOD FOR CHANNELLED TRANSPORT OF FRUITS USING A FLUID PATHWAY

Cross Reference to Related Applications

The present application is a National Phase Application of International Application No. PCT/NL2006/000578, filed Nov. 17, 2006, which claims priority to Netherlands Patent Application No. 1030450, filed Nov. 17, 2005, which applications are incorporated herein fully by this reference.

The invention relates to an apparatus for channelled transport of fruits, for instance pears, apples and tomatoes, using a fluid pathway.

Such an apparatus is applied for instance in the unloading of crates filled with fruit into a sorting device. The not very buoyant products which are suspended or sink in the fluid are herein emptied from relatively large crates into a container with fluid, usually water, from where the fruits are transferred to a sorting device.

In the transport channels known in practice congestion of fruits in the channel can occur, wherein the whole product flow can even be brought to a standstill. The extent to which blockages occur depends on, among other factors, the shape, size and specific weight of the vulnerable fruits. In addition to standstill of the apparatus and the whole further progress of the process, overflow of fluid from the transport channel can also take place. The fruits can also be damaged.

The present invention has for its object to improve the known apparatus.

The present invention provides an apparatus for channelled transport of fruits using a fluid channel, comprising:

- a frame;
- a channel for fluid arranged on the frame for the purpose of transporting the fruits between an entry side and an exit side of the channel;
- a system for causing circulation of the fluid; and
- transport influencing means for influencing transport of the fruits and/or the fluid.

The level of the fluid in the fluid channel is kept at the desired level by the fluid circulation system, on the one hand in order to minimize the chance of blockages and on the other in order to be sufficient to advance the fruits through the channel.

In a preferred embodiment according to the present invention the fluid channel is provided with at least one vibrating member. The vibrating members set the channel into vibration via a wall and thus separate fruits from each other by vibration. These vibrating members can be activated by means of fruit detection means 18, for instance a camera or photocell. Although not preferred at the moment, the transport of the fruits through the fluid channel can also be enhanced by activating the vibrating member periodically. Congestion of products in the fluid channel can hereby also be prevented.

Since it has been found in practice that, for instance during emptying of a crate with fruits into the fruit basin filled with fluid, the water level in the fluid channel can rise quickly and wave formation can occur, the fluid can overflow from the fluid channel to the surrounding area.

The above noted problem is solved with the preferred embodiment of the apparatus according to the invention, wherein the fluid channel is provided with double side walls. The fluid is situated with the products within the inner side walls and, in the case of a rise in level or wave formation, the fluid will flow by means of overflow openings or over the inner side wall and be carried from the interior of the fluid channel to the space between the inner and outer side walls. Outflow openings are provided herein for drainage of the fluid. In addition to being important in the case of wave formation, the double side walls are also important in the situation where the pressure in the transport channel becomes too high and fluid can be drained by means of the double side walls. This results in a more constant fluid level in the channel, whereby a better transport of fruits is realized with less chance of blockages. In an alternative embodiment an outer side wall can also be obtained by means of for instance a collecting tank for collecting overflowed water.

In the preferred embodiment of the apparatus according to the invention the fluid channel comprises a flat bottom, which enhances transport of the fruits and simplifies cleaning thereof.

In a preferred embodiment of the apparatus according to the present invention the fluid circulation system comprises a fluid pump and a circulation conduit with which the fluid is transported from the exit side of the fluid channel via the basin to the entry side of the channel. This creates a closed system in which the fluid used to advance the products in the fluid channel is circulated. In this circulation conduit there can also be provided a fluid container from which the water is transported via the pump to the fruit basin. The fluid in the fluid container is replenished by the fluid from the exit side of the fluid channel and from the outflow openings in the space between the inner and outer side walls of the fluid channel. If desired, the fluid level can be maintained by means of an external source.

In a further preferred embodiment of the apparatus according to the present invention there are provided fruit detection means with which the quantity of circulated fluid is reduced. These fruit detection means detect whether a flow of fruits is underway for which advancing by means of a fluid flow is required. In the case that advancing is not required, the quantity of circulated fluid can be decreased, for instance by means of reducing the pump speed, thereby achieving a more efficient processing.

In a further preferred embodiment of the apparatus according to the present invention there are provided level control means for bringing to and holding at the desired level the fluid in the channel. This means can comprise, among other parts, openings and constrictions. The level of the fluid in the fluid channel can hereby be held almost constant so that transport of fruits can take place and there is a minimal chance of blockage of fruits in the channel.

The invention also relates to a method for using this apparatus, comprising the steps of:

- unloading the fruits into a fruit basin;
- circulating water through the fluid container and the channel;
- co-displacing the fruits with the fluid flow out of the basin into the channel;
- detecting the progress of the fruits;
- activating the transport influencing means so as to influence the progress of products; and
- delivering the fruits from the channel to a discharge device.

By means of this method products are advanced with a fluid flow and, in the case a fruit blockage is detected, the transport influencing means are activated to eliminate this blockage. In an alternative application the method can also be used to buffer fruits in water channels, such as in the case of presorting of pears.

The fruits in the transport channel are herein blocked or buffered at the exit from the fluid channel by means of a blocking member. In the case of such a desired blockage or buffering the transport influencing means, such as the vibrating member, are only activated when a clearing signal is given. This clearing signal means that the blocked or buffered products can be delivered to the discharge device, and it can be generated both manually and automatically. As a result of this buffering the subsequent process steps are performed more efficiently.

Figure 2A:
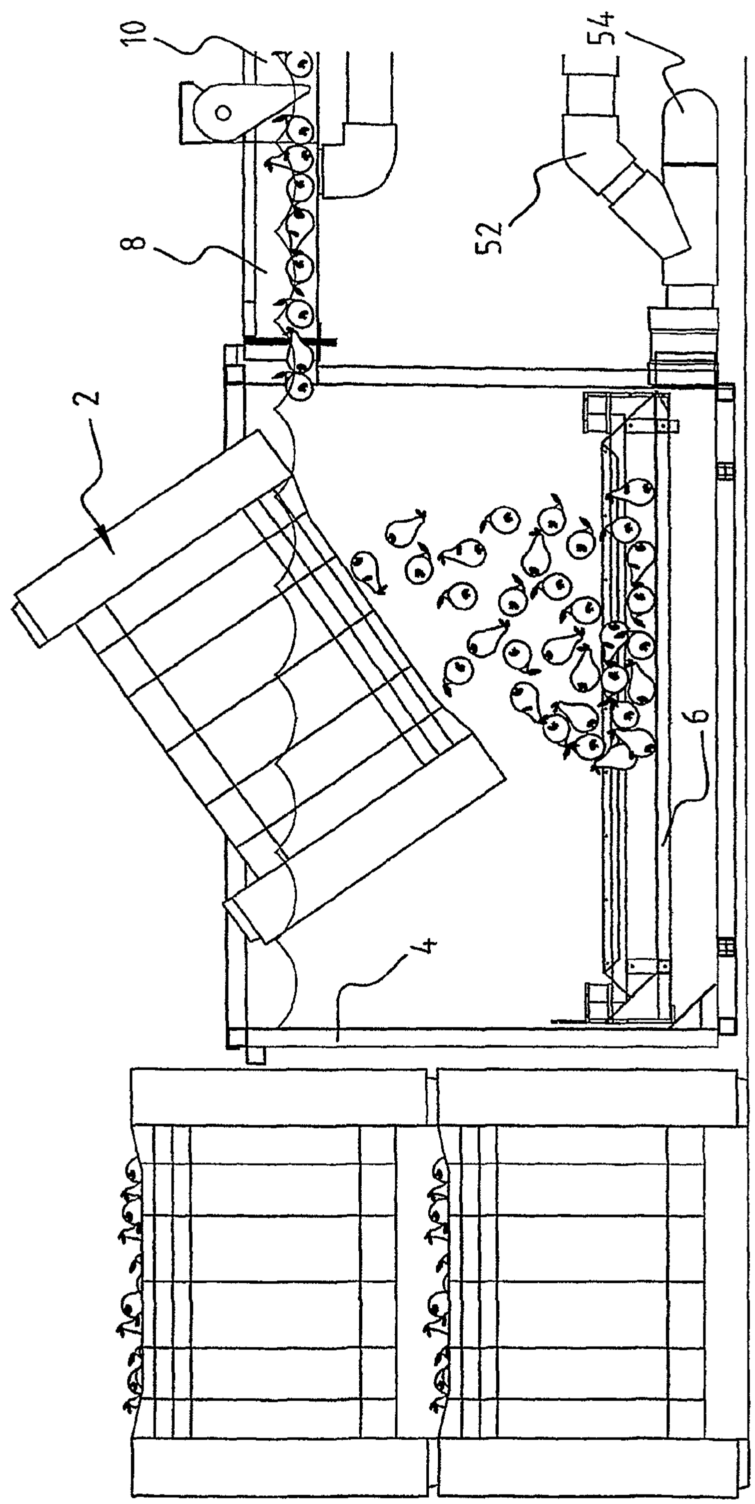
Figure 2B:
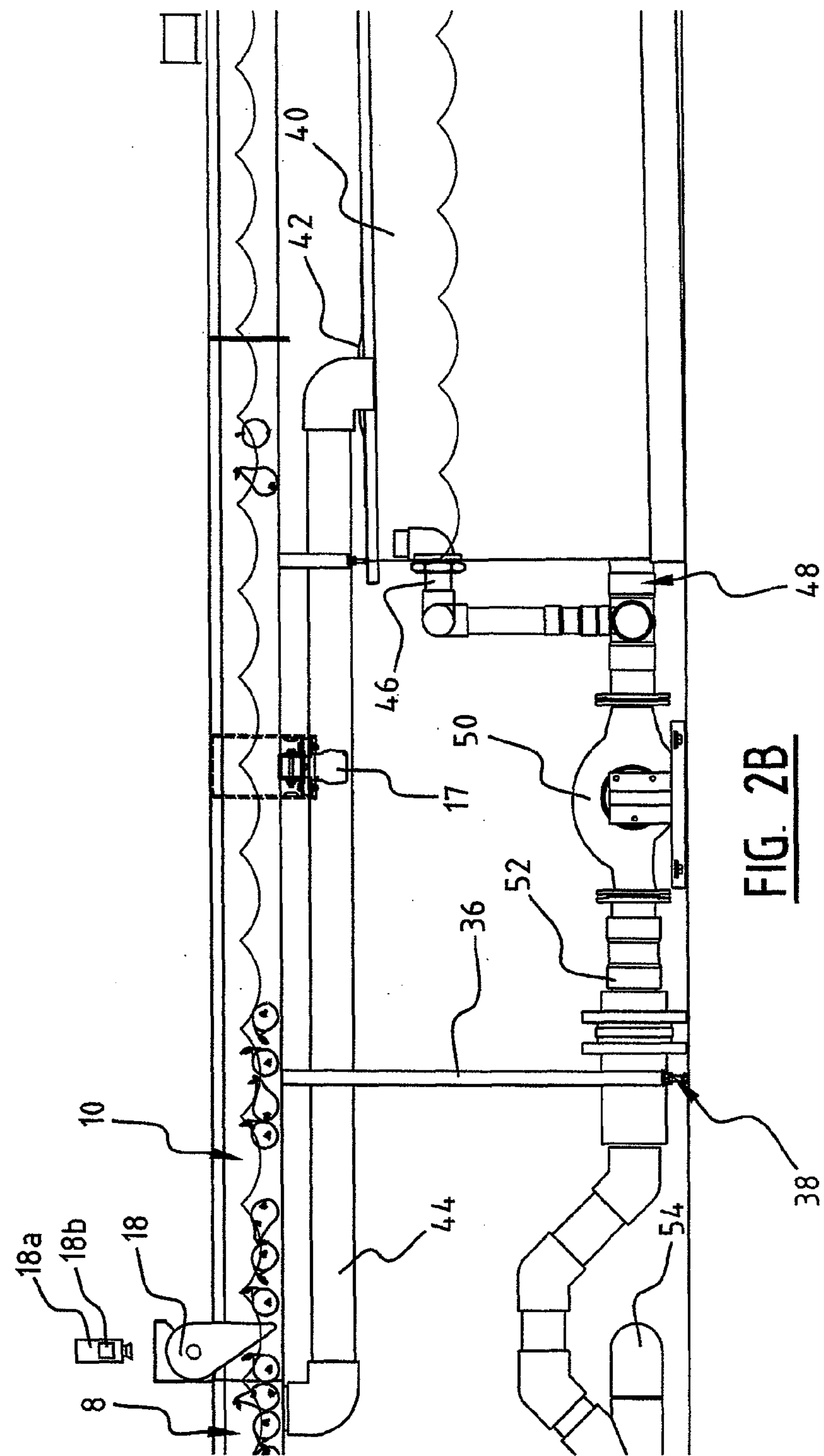
Figure 2C:
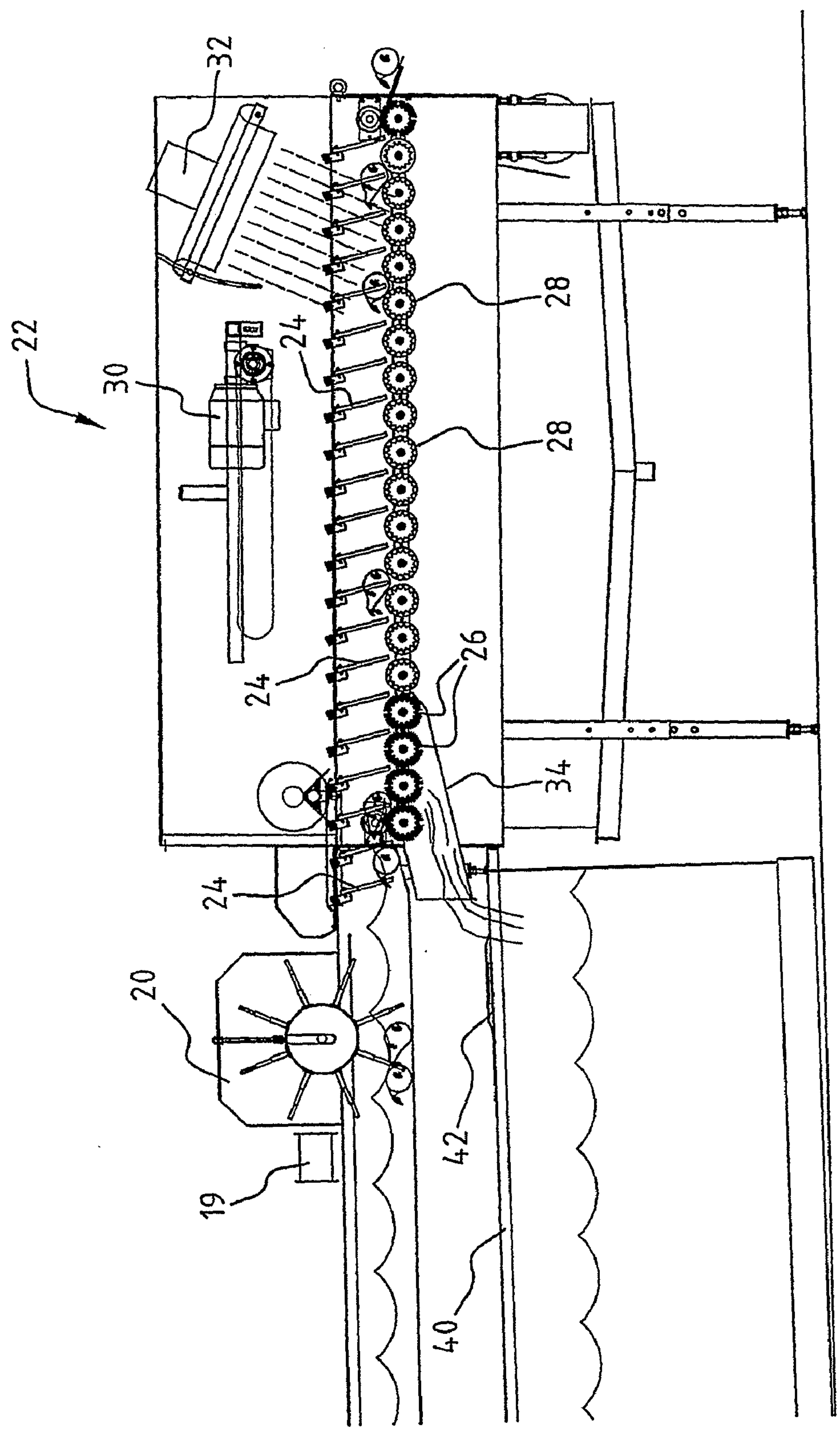
Figure 3:
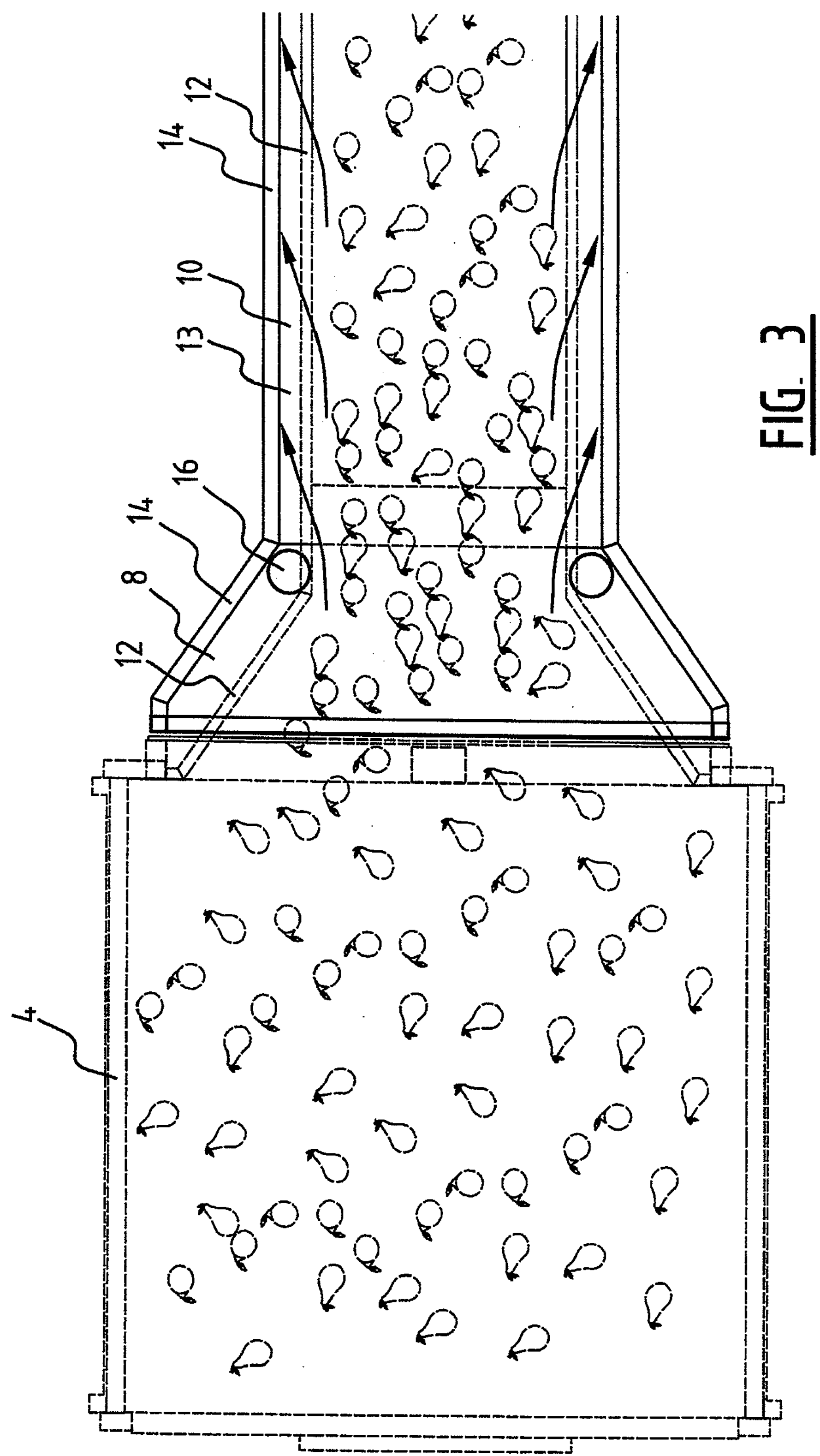

The invention will now be elucidated on the basis of a number of embodiments, wherein reference is made to the accompanying drawings, in which:

FIG. 1 shows a side view of a preferred embodiment of the apparatus according to the invention, FIG. 2A is a side view of part 2A in FIG. 1, FIG. 2B is a side view of part 2B in FIG. 1, FIG. 2C is a side view of part 2C in FIG. 1, and FIG. 3 is a top view of the apparatus of FIG. 1.

A container or crate 2 filled with fruits is emptied into a fruit basin or tank 4 filled with water. This is shown in FIG. 2A. Other dimensions can be employed depending on the type of fruit and/or the process installations to be used. In the case of sinking fruits such as pears, during emptying these fruits will come to rest on lifting platform 6 which is displaced slowly upward such that the fruits can be transported via the funnel-like connecting part 8 to water channel 10. The connecting part and the water channel are preferably embodied in stainless steel, although other materials can also be envisaged. Connecting part 8 can be placed as separate component and thereby adapted to the type of fruit to be processed. The different components are preferably connected to each other by means of flanges and associated bolt connection with seal. Other fastening methods can of course also be used.

The water channel is provided with a vibrating member or vibrating motor 17, a fruit detection means 18 and a dosing roller 20, wherein dosing roller 20 can be provided with a fruit detection means 19 as shown in FIG. 2B. In the case the fruit detection means 18 and 19 detect that a blockage of fruits threatens to occur in the water channel, vibrating member 17 is set into operation. The vibrating member can of course also be in operation continuously or periodically, or be operated manually. If desired, the vibrating member can remain in operation for a predetermined period of time or until the fruit detection means once again detects fruits at the exit side of the channel.

At the exit side of the water channel there is a discharge device 22 as shown in FIG. 2C with which the fruits are carried out of the water channel onto the rollers of the device. The discharge device, shown here in the form of a through-feed apparatus, is provided with a number of carrier fingers 24 which briefly lift up and push forward one fruit at a time until this fruit has been carried to the subsequent brush roller 26 or sponge roller 28. The carrier fingers here perform an up and downward movement. On the exit side of the water channel the discharge device 22 is extended with preferably two additional carrier means 24 as shown in FIG. 2C, with which the fruits can be carried out of the water channel onto sponge roller 28. An additional outfeed conveyor can hereby be dispensed with. Discharge device 22 further has a drive 30 for carrier fingers 24, and a fan 32. Situated below brush roller 26 is a water drainage guide 34 with which the water is fed back from the exit side of the water channel. This guide means 34 is situated under the first four brush rollers 26, whereafter the remaining rollers are so-called sponge rollers 28. Fluid channel 10 is supported and held in place by means of a frame 36. Alternative outfeed devices are of course also possible. If desired, the height of the water channel can be adjusted by means of rotating feet 38, although other means can also be used for this purpose. From the exit side of water channel 10 the water is carried by means of guide means 34 to a water tank 40, wherein the water is carried through a sieve 42 when it enters water tank 40 in order to prevent fouling of the system. Such a sieve 42 is also to be found in the outflow opening of discharge conduit 44 which transports the water from discharge openings 16 to water tank 40. Water tank 40 has an overflow protection 46 through which the water can be drained to the sewer if the water level is too high. Suction conduit 48 of fluid pump 50 is situated on the underside of water tank 40. Fluid pump 50 pumps the water via pressure pipe 52 to basin 4. Fluid pump 50 is preferably frequency-controlled so as to adjust the capacity thereof to the flow behaviour of the fruits for transporting. A non-return valve (not shown) is provided in this pressure pipe so as to prevent water from the basin being able to flow back through the pump to the basin when the pump is not operating. Also situated in pressure pipe 52 is an outlet 54 which can be used during cleaning of the basin and through which fouling can be discharged.

The dosing roller 20 controls the passage of the fruits from the water channel to the discharge device.

Use can be made of a dosing apparatus instead of this dosing roller, wherein the fruits are lifted briefly out of the water channel for the removal of for instance rotten pears.

In the preferred embodiment according to the invention the water channel is provided with a flat bottom, whereby the water level can be kept low such that such a special apparatus is not necessary and possibly occurring rotten fruit can be picked directly out of the transport channel.

FIG. 3 shows the top view of both connecting part 8 and channel 10, which are provided with an inner side wall 12 and an outer side wall 14, wherein one or more outlet openings 16 are provided in the intervening space. These are provided for water which overflows from inside the channel between the two inner side walls 12 or which enters the intervening space between the side walls 12 through an outflow opening in these side walls. In the embodiment shown in the figure the connecting part 8 narrows in the direction from container 4 to channel 10, wherein the space between the inner side walls 12 is adjusted to the type of fruit and the process installations being used. It will be apparent that, if desired, a plurality of parallel water channels can be applied. The described apparatus can also be used to fill the crates with fruits by reversing the transport flow of these fruits in the apparatus. The apparatus is preferably used for so-called sinking or suspended products: use for floating products can be considered.

The present invention is by no means limited to the above described preferred embodiments; the rights sought, within the scope of which many modifications can be envisaged, are defined by the following claims.

The invention claimed is:

1. Apparatus for transport of fruits, comprising:

a frame;

an elongated channel arranged on the frame, having a fluid medium, and configured to advance the fruits in a conveyance direction by flotation between an entry side and an exit side of the channel wherein the channel has walls;

a fluid circulation means which circulates the fluid from the entry side to the exit side for causing the fruits to be transported in the channel from the entry side to the exit side; and transport influencing means for influencing transport of the fruits and/or the fluid, wherein the transport influencing means comprise at least one vibrating member for setting a wall of the channel into vibration in response to a fruit detection means for detecting transported fruits and subsequently activating the vibrating member the influencing means configured and operable to space fruits advancing in the conveying direction along the elongated channel.

2. Apparatus as claimed in claim 1, wherein the fruit detection means comprise at least one camera or photocell.

3. Apparatus as claimed in claim 1, wherein the fruit detection means are coupled operatively to the vibrating member.

4. Apparatus as claimed in claim 1, wherein the transport influencing means comprise double side walls with an intervening space for collecting the fluid which overflows out of the interior of the fluid channel.

5. Apparatus as claimed in claim 4, wherein a number of outlets are provided in the channel for the discharge of fluid.

6. Apparatus as claimed in claim 1, wherein the channel is provided with a flat bottom.

7. Apparatus as claimed in claim 1, wherein the transport influencing means comprise a number of carrier means for a discharge device with which the fruits are discharged from the channel.

8. Apparatus as claimed in claim 1, wherein the fluid circulation means comprises:

a pump; and a circulation conduit from the exit side of the channel via a fruit basin to the entry side of the channel.

9. Apparatus as claimed in claim 8, wherein a fluid container is provided in the circulation conduit.

10. Apparatus as claimed in claim 1, wherein fruit detection means are provided for detecting a fruit flow and adjusting the quantity of circulated fluid thereto.

11. Apparatus as claimed in claim 1, wherein level control means are provided for bringing to, and holding at, the desired level the water level in the channel.

12. Apparatus as claimed in claim 1, wherein an outlet is arranged outside the channel for emptying and cleaning thereof.

13. Apparatus as claimed in claim 1, wherein the fluid channel is provided with a blocking member for generating a blockage.

14. Apparatus as claimed in claim 2, wherein the fruit detection means are coupled operatively to the vibrating member.

15. Apparatus as claimed in claim 1, wherein the channel has side walls and said vibrating member sets at least one side wall into vibration.

* * * * *